Figure 1:
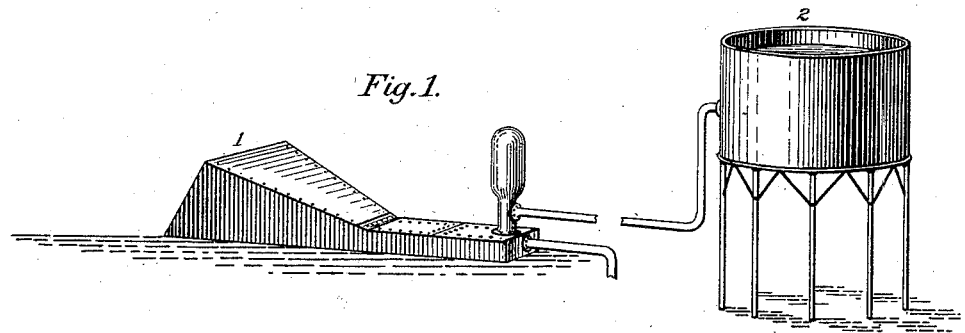

(No Model.)

F. STARKENBERG.
APPARATUS FOR UTILIZING THE FORCE OF WAVES.

No. 430,790. Patented June 24, 1890.

Witnesses:

Inventor:
Felix Starkenberg

UNITED STATES PATENT OFFICE.

FELIX STARKENBERG, OF LYNN, MASSACHUSETTS.

APPARATUS FOR UTILIZING THE FORCE OF WAVES.

SPECIFICATION forming part of Letters Patent No. 430,790, dated June 24, 1890.

Application filed October 31, 1889. Serial No. 328,772. (No model.)

*To all whom it may concern:*

Be it known that I, FELIX STARKENBERG, a citizen of the United States, residing at Lynn, in the county of Essex and State of Massachusetts, have invented certain new and useful Improvements in Apparatus for Utilizing the Force of Waves; and I do hereby declare the following to be a full, clear, and exact description of the invention, such as will enable others skilled in the art to which it appertains to make and use the same.

My invention relates to an apparatus for utilizing the force of waves for elevating water; and it has for its object to provide simple and effective means for utilizing the power or force of waves of the sea or ocean to raise water to an elevated reservoir or tank, in which the water can be stored for use in operating a water-wheel or other motor.

With this and other objects in view my invention consists of a receiving-chamber which has a broad open end for the admission of the water, an outlet or outlets at the smaller or reduced end of said receiving-chamber, and an automatic check-valve located in the receiving-chamber at a point in front of the outlet or outlets to prevent the backflow of the water after it passes the check-valve, whereby the outlet-pipe that leads to the elevated tank or reservoir is filled with water, which will be forced up into the tank by the inward rush of the waves. The waves enter the broad open receiving end of the primary or receiving chamber, which is preferably tapered in the direction of its length, and they are condensed or forced into a more compact mass as they travel through the chamber by reason of the contracted dimensions of said chamber, and the inward rush or impact of the waves on the check-valve automatically opens the latter to permit the water to pass the valve and enter the outlet-pipes, the valve being automatically closed after each wave passes the same by reason of the force of the wave being spent or exhausted, so that the water is prevented from flowing back past the check-valve and neutralizing (at least partially) the force of the succeeding waves.

I preferably provide two outlet-pipes, one for educting the water from the primary receiving-chamber to the storage-reservoir and the other for conveying off the waste water from the apparatus. The waste outlet-pipe leads from the reduced end of the receiving-chamber substantially in line therewith, while the eduction-pipe leads from a secondary chamber, which is provided above or laterally of the reduced end of the primary receiving-chamber. This secondary chamber communicates with the primary receiving-chamber at a point in rear of the automatic check-valve in the latter chamber, so that the water enters the secondary chamber from the primary chamber after it passes the check-valve, and from the secondary chamber rises or leads the eduction-pipe. In order to assist in raising or elevating the water in the eduction-pipe, I also contemplate the use of air-pressure, which is exerted on the water in the secondary chamber. The air for pressing on the water in the secondary chamber is stored within an air-reservoir erected upon the secondary chamber and communicating therewith, the point of communication of said chamber being over the port between the primary and secondary chambers in order that the inward rush of the water from the primary to the secondary chambers may be utilized to compress the air in the air-chamber, the pressure of said compressed air being exerted on the water in the secondary chamber to force the water up into the outlet eduction-pipe to the storage-reservoir. I also provide a supplemental check or relief valve between the primary and secondary chambers, which valve operates to check the backflow of water in the secondary chamber and the eduction-pipe and to relieve the valve in the primary receiving-chamber.

My invention further consists in the combination of devices and peculiar construction and arrangement of parts, as will be hereinafter more fully described and claimed.

To enable others to understand my invention, I will now proceed to a detailed description thereof, in connection with the accompanying drawings, in which—

Figure 2:
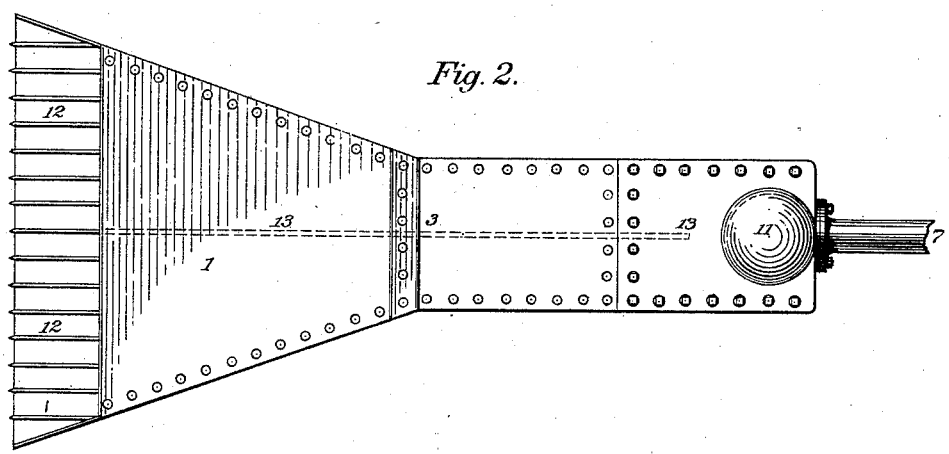
Figure 3:
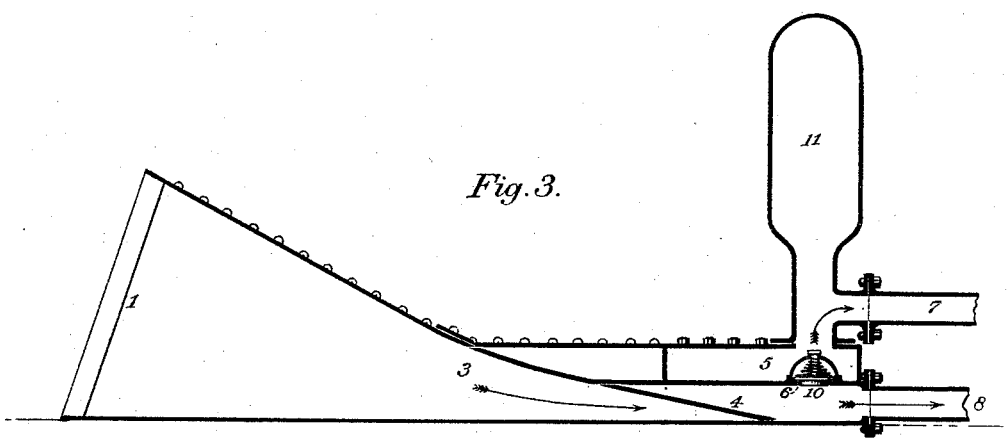

Figure 1 is an elevation of an apparatus for utilizing the power of waves embodying my invention, and showing the same in connection with an elevated storage-tank. Fig. 2 is an enlarged plan view of the apparatus, and Fig. 3 is a longitudinal sectional view taken centrally through the apparatus on one side of the longitudinal partition therein.

Referring to the drawings, in which like numerals of reference denote corresponding parts in all the figures, 1 designates the receiving-chamber of an apparatus for utilizing the force or power of the waves to elevate water to a storage tank or reservoir 2, which is or may be placed at a very high elevation above the plane of the receiving-chamber. This receiving-chamber is placed or erected on the beach, shore, or any other suitable place where it will receive the full force or effect of the waves, and it is built or constructed in a very substantial manner to resist the force of the waves, the chamber being of metal, wood, or stone, or a combination of either two of said materials. The receiving-chamber is reduced at its rear end, and in its simplest and most efficient form it is tapered longitudinally, so as to condense the waves as they pass from the enlarged front end to the rear reduced end, thus securing an increased force or power. The receiving-chamber is tapered both horizontally and vertically, so that the area of the open front end is very large, to permit a large amount of water to freely enter the receiving-chamber, while the rear end of the chamber is reduced or elongated, as at 3, sufficiently to receive the primary check-valve 4. This check-valve in its simplest form consists of a flat plate of spring metal, which is arranged in a vertically-inclined position in the elongated reduced end 3 of the receiving-chamber, and when said chamber is made of metal this spring-plate, which constitutes the primary check-valve, may be made a part of the chamber by extending the top or wall of the chamber 2 down across the reduced elongated rear end 3 of the chamber, as is obvious. I do not, however, confine myself to the particular form of primary check-valve just described as an embodiment of my invention, as I am aware that other forms of check-valves can be used without departing from the spirit or sacrificing the advantages of the invention.

The spring-plate check-valve 4 has sufficient elasticity to yield when the inward rush or impact of the waves strikes against the same, and when the force of the wave is spent or exhausted the valve 4 automatically closes and prevents backflow of the water in the reduced elongated end 3 of the chamber 1 and the outlet-pipes. By inclining the valve 4 substantially as shown and described the back-pressure of the water in the reduced rear end 3 of the chamber serves to normally close the valve against the bottom of the chamber, and thus relieve the body of the valve of considerable strain.

5 designates the secondary chamber, which communicates through an intermediate port 6 with the reduced rear end of the chamber, the port being located in rear of the primary check-valve 4. This secondary chamber may be located above the primary receiving-chamber, as shown, or it may be arranged laterally thereof, and from the primary and secondary chambers lead the outlet-pipes 7 8, one pipe 7 leading from the secondary chamber 5 to the elevated storage-tank 2, while the other pipe 8 leads from the primary chamber 1 at a point in rear of the port 6 between the primary and secondary chambers 1 and 5, respectively, said port 6 being normally closed by a supplemental check-valve 10.

When the waves rush in the reduced elongated end 3 of the primary receiving-chamber after passing the primary check-valve 4, a part of the water will raise the secondary check-valve 10 and enter the secondary chamber 5, and the surplus water will pass into the outlet waste-pipe 8, which returns the water to the sea. The pressure of the water in the secondary chamber causes the water to enter and rise in the eduction-pipe 7, from whence the water flows in the elevated storage-reservoir 2, from which the water can be drawn for operating a water-wheel or other motor. I also utilize the force or pressure of compressed air on the water in the secondary chamber 5 to assist in raising the water in the eduction-pipe 7; and with this end in view I erect on the secondary chamber a vertical air reservoir or chamber 11, which communicates at its lower end with the secondary chamber. The point of communication of the air reservoir or chamber 11 with the secondary water-chamber 5 is preferably immediately over the inlet-port 6, so that the inward rush of the water into the secondary chamber serves to compress the air in the air-chamber, the pressure of the stored compressed air in the chamber 11 being exerted on the water in the eduction-pipe 7 to assist in raising the water in said pipe to the elevated storage-tank, as is obvious. The check-valve 10 between the primary and secondary water-chambers is of the ordinary kind, which is capable of vertical play, and is normally returned to its seat by a retracting-spring, and this supplemental check-valve serves to prevent backward flow of the water from the secondary chamber to the primary chamber and to relieve the primary check-valve from the weight of the water in the secondary chamber and eduction-pipe 7 and the pressure of air in the air-chamber or reservoir 11.

Across the open front end of the receiving-chamber I provide a series of spaced bars 12, which are suitably secured to the chamber 1 in a rigid firm manner, and these bars serve to exclude débris and floating matter from the receiving-chamber and obviate clogging of the apparatus.

A vertical partition 13 extends longitudinally through the front end of the receiving-chamber 1, in the middle thereof, in order to brace and strengthen the walls of the same.

The operation and advantages of my invention will be readily understood and appreciated by those skilled in the art to which it relates from the foregoing description, taken in connection with the drawings, and I do not therefore deem it essential to repeat the same at the end of this specification.

I am aware that modifications and alterations of the devices and arrangement thereof herein shown and described as an embodiment of my invention can be made, and I would therefore have it understood that I hold myself at liberty to make such changes as fairly fall within the scope of my invention.

Having thus fully described my invention, what I claim as new, and desire to secure by Letters Patent, is—

1. An apparatus for utilizing the force of waves, substantially as described, consisting of a receiving-chamber having an outlet or outlets, and a check-valve located within the chamber between its receiving end and the outlet and directly in the path of the waves entering the chamber, as and for the purpose described.

2. An apparatus for utilizing the force of waves, substantially as described, consisting of a tapered receiving-chamber having an enlarged open end for the admission of waves, an eduction-pipe at the rear end of said chamber, and an automatic check-valve within the chamber directly in the path of the waves entering the same and located between the receiving-orifice of the chamber and the eduction-pipe, as and for the purpose described.

3. An apparatus for utilizing the force of waves, substantially as described, consisting of a receiving-chamber having an enlarged or flaring end for the admission of waves and an elongated reduced rear end, an eduction-pipe leading from the reduced end of said chamber, a waste-pipe communicating with the chamber, and an automatic check-valve located within said receiving-chamber between the receiving-orifice thereof and the eduction and waste pipes, substantially as described.

4. In an apparatus for utilizing the force of waves, the combination of a primary receiving-chamber, an automatic check-valve therein, a secondary chamber communicating with primary chamber, and an eduction-pipe leading from the secondary chamber, substantially as described.

5. In an apparatus for utilizing the force of waves, the combination of a primary receiving-chamber, an automatic check-valve therein, a secondary chamber communicating with the primary chamber at a point in rear of its check-valve, another check-valve between the primary and secondary chambers, and an eduction-pipe leading from the secondary chamber, substantially as described.

6. In an apparatus for utilizing the force of waves, the combination of a primary receiving-chamber having an automatic check-valve and a waste-pipe, a secondary chamber communicating with the primary chamber at a point between the check-valve and waste-pipe of the latter chamber, and an eduction-pipe leading from the secondary chamber, substantially as described.

7. In an apparatus for utilizing the force of waves, the combination, with a primary receiving-chamber having an automatic check-valve, of a secondary chamber communicating with the primary chamber and having a supplemental check-valve to prevent back-flow of the water from the secondary chamber to the primary chamber, an air reservoir or chamber communicating with the secondary chamber, and an eduction-pipe from the secondary chamber, substantially as described.

8. In an apparatus for utilizing the force of waves, the combination, with a primary receiving-chamber having a check-valve, of a secondary chamber communicating with the primary chamber, a check-valve between the primary and secondary chambers, a vertical air reservoir or chamber erected on the secondary chamber and communicating with the latter at a point substantially over the port intermediate of the primary and secondary chambers, and an eduction-pipe leading from the secondary chamber, substantially as described.

9. In an apparatus for utilizing the force of waves, a primary receiving-chamber having an enlarged open end and bars arranged across the open end of said receiving-chamber, substantially as described.

10. In an apparatus for utilizing the force of waves, the longitudinally-tapered receiving-chamber having the fixed spaced bars at its open end and a longitudinal partition, an automatic check-valve arranged in an inclined position in the reduced rear end of said chamber, a secondary chamber, and an eduction-pipe leading from the secondary chamber, substantially as described.

In testimony whereof I affix my signature in presence of two witnesses.

FELIX STARKENBERG.

Witnesses:
HENRY L. MARCY,
ROBERT T. BABSON.